United States Patent
Yamamoto

(10) Patent No.: US 10,723,241 B2
(45) Date of Patent: Jul. 28, 2020

(54) VEHICLE OCCUPANT MONITORING SYSTEM WITH FRONT AND REAR SENSORS AND METHOD THEREOF

(71) Applicant: Honda Motor Co., Ltd., Tokyo (JP)

(72) Inventor: Stuart Masakazu Yamamoto, La Mirada, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/215,890

(22) Filed: Dec. 11, 2018

(65) Prior Publication Data

US 2020/0079242 A1    Mar. 12, 2020

Related U.S. Application Data

(60) Provisional application No. 62/729,907, filed on Sep. 11, 2018.

(51) Int. Cl.
*B60Q 1/00*     (2006.01)
*B60N 2/00*     (2006.01)
*G08B 21/02*    (2006.01)
*G08B 21/24*    (2006.01)
*G08B 21/22*    (2006.01)

(52) U.S. Cl.
CPC ........... *B60N 2/002* (2013.01); *G08B 21/02* (2013.01); *G08B 21/22* (2013.01); *G08B 21/24* (2013.01)

(58) Field of Classification Search
CPC ........ B60N 2/002; G08B 21/02; G08B 21/24; G08B 21/22
USPC ........................................................ 340/457
See application file for complete search history.

(56) References Cited

U.S. PATENT DOCUMENTS

| | | |
|---|---|---|
| 5,949,340 A | 9/1999 | Rossi |
| 6,737,975 B2 | 5/2004 | Pelletier |
| 8,493,201 B2 | 7/2013 | Orbach |
| 9,014,920 B1 | 4/2015 | Torres |
| 2008/0218381 A1* | 9/2008 | Buckley ............. B60Q 1/50 340/932.2 |
| 2012/0050021 A1* | 3/2012 | Rao .................... B60N 2/002 340/425.5 |
| 2016/0042616 A1 | 2/2016 | Dorsey |

(Continued)

FOREIGN PATENT DOCUMENTS

| | | |
|---|---|---|
| CN | 107839596 A | 3/2018 |
| DE | 102013220240 A1 | 4/2015 |
| JP | 2014051113 A | 3/2014 |

*Primary Examiner* — Tanmay K Shah
(74) *Attorney, Agent, or Firm* — Honda Patents & Technologies North America, LLC; Aaron C. Fong

(57) ABSTRACT

Generally described, a vehicle occupant monitoring system with front and rear sensors that scan different sections or areas at different times within a vehicle is presented. A number of different sensors may be included that monitor the front row, second row, third row and rear storage of the vehicle. The system may deactivate the front and rear sensors when the vehicle is unlocked. The system may determine whether a rear door has been closed. If the rear door has not been opened, the rear sensors may remain inactive. However, and when the rear door has been closed, the system activates the rear sensors until the vehicle begins moving. A notification may be provided when an occupant has been detected by the rear sensors after the vehicle is placed in park. The front and rear sensors may be activated when the vehicle is locked.

21 Claims, 6 Drawing Sheets

(56) References Cited

U.S. PATENT DOCUMENTS

| | | |
|---|---|---|
| 2018/0059209 A1 | 3/2018 | Cuddihy et al. |
| 2018/0111597 A1* | 4/2018 | May .................. B60W 50/0097 |
| 2018/0174419 A1 | 6/2018 | Biondo et al. |
| 2018/0253959 A1 | 9/2018 | Lucas et al. |
| 2019/0009695 A1* | 1/2019 | Schonfeld ............ B60N 2/0292 |

* cited by examiner

| TIME | | FRONT SENSOR (102) | SECOND ROW SENSOR (104) | THIRD ROW SENSOR (106) | STORAGE SENSOR | NOTIFICATION (108) |
|---|---|---|---|---|---|---|
| 402 | UNLOCK DOOR | — | — | — | — | |
| 404 | REAR DOOR OPENED | — | — | — | — | |
| 406 | CHILD PLACED IN CAR | — | ✓ | ✓ | ✓ | |
| 408 | REAR DOOR CLOSED | — | ✓ | ✓ | ✓ | |
| 410 | DRIVER DOOR OPENED | — | ✓ | ✓ | ✓ | |
| 412 | DRIVER DOOR CLOSED | — | ✓ | ✓ | ✓ | |
| 414 | START IGNITION | — | — | — | — | |
| 416 | SHIFT GEAR IN DRIVE | — | — | — | — | |
| 418 | DRIVE (0mph) | — | — | — | — | |
| 420 | DRIVE (1+mph) | — | — | — | — | |
| 422 | SHIFT GEAR IN PARK | — | — | — | — | |
| 424 | END IGNITION | — | — | — | — | ✓ |
| 426 | DRIVER DOOR OPENED | — | — | — | — | |
| 428 | DRIVER DOOR CLOSED | — | — | — | — | |
| 430 | REAR DOOR OPENED | — | — | — | — | |
| 432 | REMOVE CHILD FROM CAR | — | — | — | — | |
| 434 | REAR DOOR CLOSED | — | ✓ | ✓ | ✓ | |
| 436 | LOCK VEHICLE | ✓ | — | — | — | |

| | FRONT SENSOR 102 | SECOND ROW SENSOR 104 | THIRD ROW SENSOR 106 | STORAGE SENSOR 108 | NOTIFICATION |
|---|---|---|---|---|---|
| 502 UNLOCK DOOR | | | | | |
| 504 DRIVER DOOR OPENED | | | | | |
| 506 DRIVER DOOR CLOSED | | | | | |
| 508 START IGNITION | | | | | |
| 510 SHIFT GEAR IN DRIVE | | | | | |
| 512 DRIVE (0mph) | | | | | |
| 514 DRIVE (1+mph) | | | | | |
| 516 SHIFT GEAR IN PARK | | | | | |
| 518 END IGNITION | | | | | |
| 520 DRIVER DOOR OPENED | | | | | |
| 522 DRIVER DOOR CLOSED | | | | | |
| 524 LOCK VEHICLE | ✓ | ✓ | ✓ | ✓ | |

VEHICLE OCCUPANT MONITORING SYSTEM WITH FRONT AND REAR SENSORS AND METHOD THEREOF

REFERENCE TO RELATED DISCLOSURE

This disclosure claims priority to U.S. Provisional Application Ser. No. 62/729,907 titled VEHICLE OCCUPANT MONITORING SYSTEM WITH MULTIPLE SENSORS AND METHOD THEREOF that was filed on Sep. 11, 2018 by Stuart Masakazu Yamamoto which is hereby incorporated by reference in its entirety.

BACKGROUND

In many instances a driver may transport children, pets or other rear seat passengers within a vehicle. These occupants may not be able to communicate their presence to the driver upon the driver exiting the vehicle. For example, the one or more rear seat occupants may be in a state of sleep, may be an infant within a rear-facing car seat, or a pet that is laying across one or more vehicle seats. The driver of the vehicle may forget about the presence of the rear seat passengers upon exiting the vehicle.

The present disclosure provides for a vehicle occupant monitoring system with front and rear sensors and method thereof that addresses the above-identified concerns. Other benefits and advantages will become clear from the disclosure provided herein and those advantages provided are for illustration. The statements in this section merely provide the background related to the present disclosure and does not constitute prior art.

BRIEF DESCRIPTION

This summary is provided to introduce a selection of concepts in a simplified form that are further described below in the DESCRIPTION OF THE DISCLOSURE. This summary is not intended to identify key features of the claimed subject matter, nor is it intended to be used as an aid in determining the scope of the claimed subject matter.

In accordance with one aspect of the present disclosure, a vehicle occupant monitoring system within a vehicle is provided. The system may include at least one front sensor, at least one rear sensor, at least one processor and a memory operatively coupled to the processor, the memory storing program instructions that when executed by the processor, causes the processor to perform processes. The processes may include determining whether a rear door has been closed, activating the at least one rear sensor when the rear door has been closed, deactivating the at least one rear sensor when the vehicles moves and providing a notification when an occupant has been detected by the at least one rear sensor and the vehicle is turned off.

In accordance with another aspect of the present disclosure, a method of detecting an occupant within a vehicle is provided. The method may include deactivating a front and rear sensor within the vehicle, determining whether a rear door has been closed, activating the rear sensor when the rear door has been closed, deactivating the rear sensor when the vehicles moves, and providing a notification when an occupant has been detected by the rear sensor after the vehicle is placed in park.

In accordance with yet another aspect of the present disclosure, a vehicle is provided that may include at least one front sensor and at least one rear sensor. In addition, the vehicle may include a control system determining whether a rear door has been closed and activating the at least one rear sensor when the rear door has been closed, the control system deactivating the at least one rear sensor when the vehicles moves and providing a notification when an occupant has been detected by the at least one rear sensor when the vehicle is placed in park.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

FIG. 4 is a schematic diagram of an illustrative chart showing active sensors when a rear door has been opened in accordance with one aspect of the present disclosure;

FIG. 5 is a schematic diagram of an illustrative chart showing active sensors when no rear vehicle door has been opened in accordance with one aspect of the present disclosure.

DESCRIPTION OF THE DISCLOSURE

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

Generally described, a vehicle occupant monitoring system with front and rear sensors that scan different sections or areas at different times within a vehicle is presented. A number of different sensors may be included that monitor the front row, second row, third row and rear storage of the vehicle. The system may deactivate the front and rear sensors when the vehicle is unlocked. The system may determine whether a rear door has been closed. If the rear door has not been opened, the rear sensors may remain inactive. However, and when the rear door has been closed, the system activates the rear sensors until the vehicle begins moving. A notification may be provided when an occupant has been detected by the rear sensors after the vehicle is placed in park. The front and rear sensors may be activated when the vehicle is locked.

Numerous other modifications or configurations to the vehicle occupant monitoring system will become apparent from the description provided below. For example, instead of two rear rows in the vehicle, the system may work or be implemented in vehicles having a single rear row. The system may also be part of a larger occupant monitoring system that incorporates the use of other equipment such as seatbelt latch sensors. Advantageously, the vehicle occupant monitoring system may remove the power consumption used by the front sensors which may be much more complex than the other sensors in the different sections. Other advantages may include removing an accidental notification or false positive that is incorrectly detecting occupants in the rear areas. Additional advantages will be described and become apparent from the description provided below.

Figure 1:
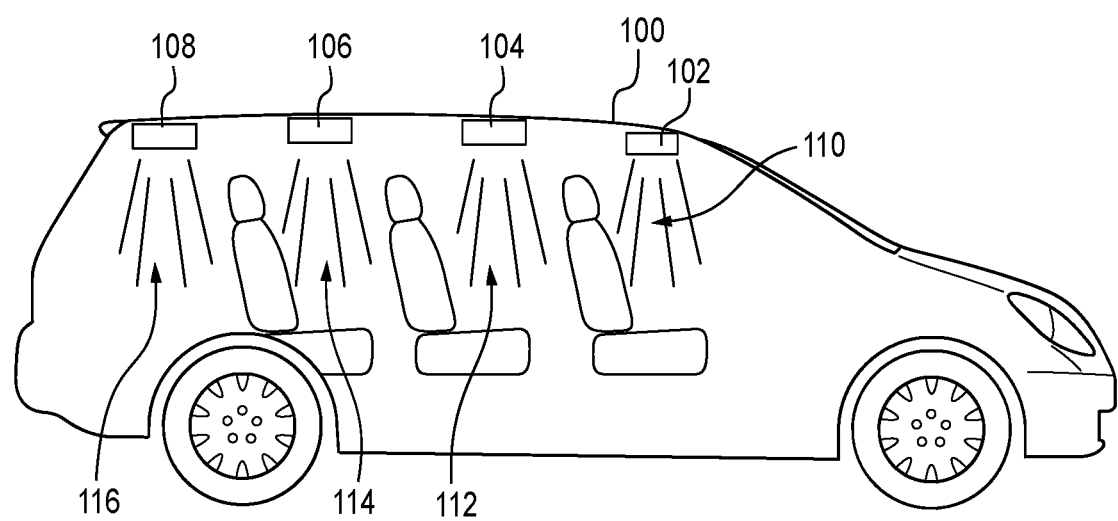
FIG. 1 is a schematic diagram of an illustrative cross section of a vehicle showing sensors in accordance with one aspect of the present disclosure.

Turning to FIG. 1, a schematic diagram of an illustrative cross section of a vehicle 100 showing sensors 102, 104, 106 and 108 in accordance with one aspect of the present disclosure is provided. The sensors 102, 104, 106 and 108 within the vehicle 100 are for purpose of illustration and should not be construed as limiting. For example, in sedans, the vehicle 100 may only include a front sensor 102 and only one of the rear sensors 104 or 106. While placement of the sensors 102, 104, 106 and 108 are shown as embedded into the roof of the vehicle 100, the sensors 102, 104, 106 and 108 may be placed in different areas, such as, within the doors or seats.

The sensors 102, 104, 106 and 108 may detect changes in the environment or detect events to determine whether an occupant is within the vehicle 100. A number of different sensors 102, 104, 106 and 108 may be used that include a wide variety of technologies. In one embodiment, the sensors 102, 104, 106 and 108 may be infrared sensors. These may work on heat difference detections by measuring infrared radiation. The sensors may include a pyroelectric sensor which may detect the sudden presence of objects (such as humans or animals) who radiate a temperature different from the temperature of the background, such as the temperature of the vehicle 100.

The sensors 102, 104, 106 and 108 may be environmental sensors. These sensors 102, 104, 106 and 108 may measure temperature, humidity and $CO_2$ levels within the vehicle 100. Ultrasonic sensors may also be used for the sensors 102, 104, 106 and 108. These may work on a Doppler shift principle by sending high frequency sound waves in the vehicle 100 and checking for their reflected patterns. If the reflected pattern is changing continuously then the vehicle occupant monitoring system may assume that there is occupancy. If the reflected pattern is the same for a preset time then the system may assume that there is no occupancy.

In one embodiment, the sensors 102, 104, 106 and 108 may use microwaves. Similar to the ultrasonic sensor, a microwave sensor may also work on the Doppler shift principle. A microwave sensor may send high frequency microwaves in an area and check for their reflected patterns. If the reflected pattern is changing continuously then it may assume that there is an occupant. If the reflected pattern is the same for a preset time then the sensor may assume that there is no occupant.

Other types of sensors 102, 104, 106 and 108 may be used. For example, audio sensors, proximity sensors, accelerometers, pressure sensors, light sensors, ultrasonic sensors, passive acoustic sensors, laser detectors or the like may be used to detect whether an occupant or occupants are within the vehicle 100. There may be some overlap in detection from the different sensors 102, 104, 106 and 108 but typically one sensor is dedicated for each area 110, 112, 114 and 116 within the vehicle 100.

The front sensor 102 may focus on the front area 110 of the vehicle 100. The front sensor 102 may be positioned differently from the other sensors 104, 106 and 108 typically in a more horizontal position such that it may have a view of the entire interior of the vehicle 100.

The second row sensor 104 may scan or monitor the second row area 112, which may be located behind the front area 110. The third row sensor 106 may monitor the third row area 114, which may be located behind the second row area 112. Behind the third row area 114 may be a storage sensor 108 which monitors the storage area 116. The rear sensors may include the second row sensor 104, the third row sensor 106 and the storage sensor 108. The rear sensors 104, 106 and 108 may be positioned in a more downward position such that the immediate area below the sensors 104, 106 and 108 may be monitored. While it was shown that each sensor 102, 104, 106 or 108 may monitor different singular areas 110, 112, 114 or 116, a single sensor 102, 104, 106 or 108 may monitor multiple areas 110, 112, 114 or 116. For example, the front sensor 102 may monitor the front area 110 and second row area 112 or the second row sensor 104 may monitor the second row area 112 and the third row area 114.

After receiving a detection from the sensors 102, 104, 106 and 108 within the areas 110, 112, 114 and 116, the occupant monitoring system may provide a notification depending on whether an occupant has been detected. Notifications may be presented to the driver, or other party, about the occupant who may have been left in the vehicle 100. This notification may be in the form of a warning sent to the driver's phone or mobile device. Other types of notifications may be provided such as a honk of a horn on the vehicle 100. One other type of notification may include the inability to lock a vehicle door if there is a detected occupant. The notification may be presented on a dashboard or head unit of the vehicle 100.

To provide additional value or benefit, the different sensors 102, 104, 106, and 108 may scan the vehicle 100 using different techniques. Specifically, the second row area 112, third row area 114, and storage area 116 may be monitored when a rear door of the vehicle 100 is opened first to place an occupant in and closed afterwards through the second row sensor 104, third row sensor 106 and storage sensor 108. The front sensor 102 monitoring the front row 110 may be held inactive.

Figure 2:
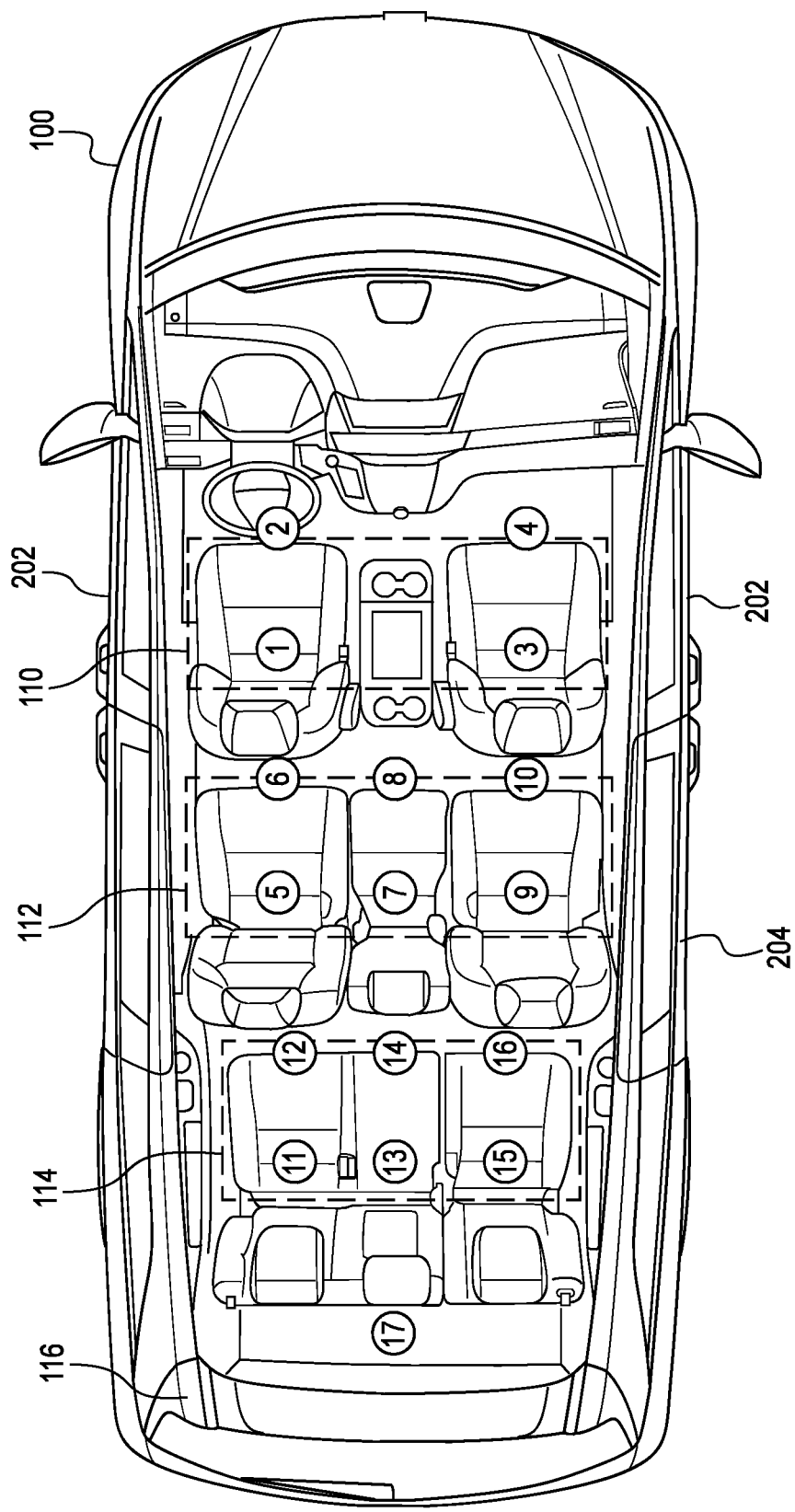
FIG. 2 is a schematic diagram of an illustrative top down view of areas within the vehicle for monitoring or scanning in accordance with one aspect of the present disclosure.

FIG. 2 is a schematic diagram of an illustrative top down view of areas 110, 112, 114 and 116 within the vehicle 100 for monitoring or scanning in accordance with one aspect of the present disclosure. The front sensor 102, when active, may monitor the front area 110 of the vehicle 100. The front area 110 may include Sections 1, 2, 3 and 4. These Sections 1, 2, 3 and 4 may be associated with the front driver and passenger seats. The second row sensor 104 may scan or monitor the second row area 112. Typically, this may be associated with Sections 5, 6, 7, 8, 9 and 10. The third row sensor 106 may scan the third row area 114 which may include Sections 11, 12, 13, 14, 15 and 16, while the storage sensor 108 may scan the storage area 116 that includes Section 17.

Sections 1 through 17 may represent different scanning portions by the sensors 102, 104, 106 and 108. In one embodiment, the Sections are focused at the cushion and leg area for each seat. By focusing on certain known locations of where an occupant may be located, the sensors 102, 104, 106 and 108 may reduce the amount of false positives encountered while scanning for those occupants. Other placements of the Sections may be defined and are not limited to those shown.

Figure 3:
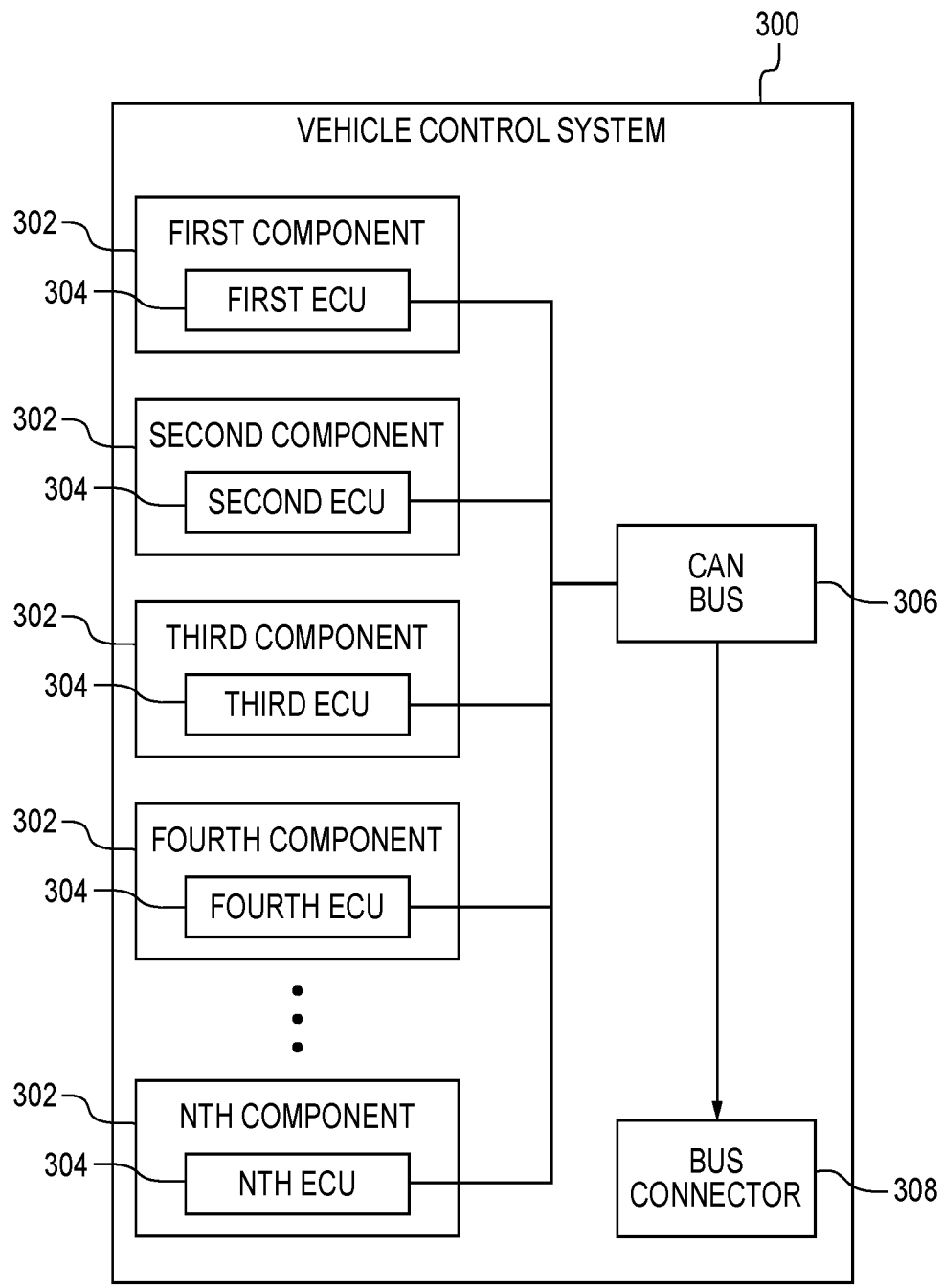
FIG. 3 is a schematic diagram that provides an illustrative vehicle control system within the vehicle for monitoring occupants in accordance with one aspect of the present disclosure.

As will be shown below, the vehicle occupant monitoring system may use mechanisms or logic to active those sensors 102, 104, 106 and 108, which may be embodied in a vehicle control system. The front doors 202 and rear doors 204 may be used to determine when to active the sensors 102, 104, 106 and 108. FIG. 3 is a schematic diagram that provides an illustrative vehicle control system 300 within the vehicle 100 for monitoring occupants in accordance with one aspect of the present disclosure. The system 300 may include multiple automotive components 302A through 302N (collectively "components 302" or individually "component 302") that may communicate via electronic control units 304A through 304N (collectively "ECUs 304" or individually "ECU 304"). The components 302 may include individual apparatuses, systems, subsystems, mechanisms and the like that may be included in the vehicle 100. The components 302 may include, but are not limited to door locks, ignition system, windshield wipers, brakes, engines, GPS and navigation systems, tachometer and the like.

In one particular embodiment, a first ECU 304A associated with the first component 302A may be provided. The first component 302A may be a door lock. The first component 302A may be associated with a number of door locks or a single lock on the front doors 202 and rear doors 204 of the vehicle 100. The first ECU 304A may communicate a state or a condition of the first component 302A as a data signal to the CAN bus 306. For example, the first ECU 304A may communicate whether the door is locked or unlocked in real time to the CAN bus 306.

A signal or communication may be provided to the first ECU 304A to open or close the door lock 302A. The signal or communication may be sent from the first ECU 304A to the first component 302A. Different signals may be received and provided to the first ECU 304A to lock and unlock the doors.

Associated with the first component 302A may be a second component 302B that may include sensors for the front doors 202 and rear doors 204. The second component 302B may be triggers or switches that indicates whether the front doors 202 and rear doors 204 are open and closed. A signal or communication may be sent from the triggers or switches to the ECU 304B. A state or a condition of the second component 302B may be provided as a data signal to the CAN bus 306. For example, with the second component 302B, the second ECU 304B may communicate whether the door is opened and closed in real time to the CAN bus 306.

A third component 302C may include the front sensor 102, as described above. The third component 302C may be controlled by a third ECU 304C. The third component 304C may be activated or deactivated depending on instructions given by the vehicle control system 300 as a data signal from the CAN bus 306. By activating the front sensor 102, the front area 110 may be scanned or monitored for occupants in Sections 1, 2, 3 and 4.

A fourth component 302D may include the rear sensors 104, 106, and 108. The rear sensors 104, 106, and 108 may be individually activated or deactivated through a fourth ECU 304D or multiple ECUs 304. A state or condition of the fourth component 302D may be provided as a data signal or communication to the CAN bus 306. Furthermore, a communication or signal may be sent from the fourth ECU 304D to the fourth component 302D to control them. The fourth 302D may be activated or deactivated depending on instructions given by the vehicle control system 300 as a data signal or communication. By activating the rear sensors 104, 106, and 108, the second row area 112, third row area 114, and storage area 116 may be monitored or scanned. This may include Sections 5 through 17, as described earlier.

The first ECU 306A to the Nth ECU 306N may provide the data signals or communications to the CAN bus 306 regarding the state or the condition of the first component 302A to the Nth component 302N, respectively. The data signals or communications may include, positions of the doors, activation or deactivation of the sensors 102, 104, 106, and 108 and the like. Signals or communications may come from or be distributed to the ECUs 304 and to the components 302.

In some embodiments, the CAN bus 306 may be coupled to a bus connector 308 that enables access to the CAN bus 306. For example, in this and other embodiments, the vehicle 100 may include a dashboard or head unit to display occupant notifications. The bus connector 308 may be configured according to an OBD 1 specification, for instance. In embodiments with multiple CAN buses 306, the vehicle 100 may include multiple bus connectors 308 and alternative bus connectors that enable access to one or more CAN buses 306.

In most modern vehicles, the CAN bus 306 may include the bus connector 308 located under the hood or accessible through the removal of a panel in the cabin of the vehicle 100. However, embodiments described herein may be implemented by using a connector that connects with CAN bus 306 in any available way.

In one embodiment, the vehicle control system 300 may communicate with remote resources, for example, to provide notifications outside the vehicle 100. This communication may occur through a transmission control unit (TCU) associated with the vehicle 100. The bus connector 308 may be connected to a mobile device in one embodiment. In operation, the mobile device may be able to receive occupant notifications through the components 304 and communicated by the ECUs 306.

Turning to FIG. 4, a schematic diagram of an illustrative chart 400 showing active sensors when a rear door 204 has been opened in accordance with one aspect of the present disclosure is provided. The vehicle control system 300 may implement or process the triggers or events using the chart 400, or through other type of mechanism. The chart 400, on the left side, indicates an event or trigger that may be used by the system 300. These events or triggers may be processed by activation and deactivation of the sensors 102, 104, 106 and 108.

The events or triggers of the chart 400 may vary and those shown are for purposes of illustration. Initially, both the front sensor 102 and the rear sensors 104, 106 and 108 may be activated when the vehicle 100 is in a locked state. At row 402, the doors 202 or 204 may be unlocked. This may be detected by the first component 302A and by the first ECU 304A. This information may be communicated via the CAN bus 306. This may place the sensors 102, 104, 106 and 108 into an inactive or deactivated state. This may occur through the third component 302C and fourth component 302D with communication occurring through the third ECU 304C and fourth ECU 304D of the vehicle control system 300.

The rear door may be opened at row 404. The opening of the rear door 204 event may be detected by the second component 302B and transmitted or processed by the second ECU 304B. The sensors 102, 104, 106 and 108 may be kept inactive or off by the vehicle control system 300. At row 406, a child, pet or other object may be placed into the rear of the vehicle 100. This may be in the second row area 112, third row area 114 and storage area 116. The rear sensors 104, 106 and 108 may remain inactive until the rear door 204 is closed and then they are activated at row 408. The front sensor 102 may remain inactive as the system 300 may intend to scan or monitor only Sections 5 through 17 of the vehicle 100.

The rear sensors 104, 106 and 108 may continue to scan or monitor at row 410, where the driver or front passenger door 202 is opened first, and at row 412, where the driver door or front passenger door 202 is closed 412. Other actions may be taken and are not limited to such. Each of these may be detected by the second component 302B through the second ECU 304B. The scanning or monitoring may continue for row 414 where the driver may start the vehicle's ignition and for row 416, where the driver shifts their vehicle 100 into gear. During this transition, the second row area 112, third row area 114 and storage area 116 may be monitored or scanned.

At row 418, the rear scanners 104, 106 and 108 may still be activated when the vehicle 100 is not moving. The purpose of this is to continue to monitor or scan the second row area 112, third row area 114 and storage area 116 and not receive any false positives that may be created when the vehicle 100 is moving. For example, and in some instances, shadows or other background environmental features may cause false positives that may indicate that an occupant is in the back of the vehicle 100 without actually there being one.

Scanning may end in the second row area 112, third row area 114 and storage area 116 when the vehicle 100 is moving at row 420. That is, the rear sensors 104, 106 and 108 may be inactivated. Through rows 408 to 418, the front area 110 may not be scanned with the front sensor 102 being held inactive. Accordingly, this may save power. The rear sensors 104, 106 and 108 may then be deactivated through the fourth component 302D by the vehicle control system 300 when the vehicle 100 begins moving.

The sensors 102, 104, 106 and 108 may be then held inactive for row 422 where the gear is shifted into park. When the vehicle 100 ends its ignition, at row 424, a head unit or dashboard may provide a notification of the detection of the occupant if detected. The meter/dash may display that an occupant has been detected and that they should view the back of their vehicle 100. The sensors 102, 104, 106 and 108 may still be held inactive and not scan or monitor the areas 110, 112, 114 and 116.

Continuing, the driver may open the front door 202 at row 426. The driver may then close the front door 202 at row 428. The rear door 204 may be opened at row 430 to remove the occupant at row 432. The rear door 204 may be closed at row 434. After locking the vehicle 100, each of the sections 102, 104, 106 and 108 may be scanned or monitored at row 436. This may provide a further guarantee that no other occupants are within the vehicle 100 including the front section 108.

FIG. 5 is a schematic diagram of an illustrative chart 500 showing active sensors 102, 104, 106 and 108 when no rear vehicle door 204 has been opened in accordance with one aspect of the present disclosure. The vehicle control system 300 may implement or process the triggers or events using the chart 500, or through other type of mechanism. The chart 500, on the left side, indicates an event or trigger that may be used by the system 300. These events or triggers may be processed by activation and deactivation of the sensors 102, 104, 106 and 108.

The events or triggers of the chart 500 may vary and those shown are for purposes of illustration. Initially, both the front sensor 102 and the rear sensors 104, 106 and 108 may be activated when the vehicle 100 is in a locked state. At row 502, the doors 202 or 204 may be unlocked. This may be detected by the first component 302A and communicated by the first ECU 304A through the CAN bus 306. This may place the sensors 102, 104, 106 and 108 into an inactive or deactivated state. This may occur through the third component 302C and fourth component 302D with communication occurring through the third ECU 304C and fourth ECU 304D of the vehicle control system 300.

At row 504, the driver's door 202 may be opened which may be detected by the second component 302B and communicated by the second ECU 304B. At row 506, the driver's door 202 may be closed. Noticeably, the rear doors 204 may have not been opened or closed as there may have not been an occupant or other object placed in the rear areas 112, 114 and 116. There is no separation of activating the rear sensors 104, 106 and 108 and the front sensor 102.

At row 508, the driver may start the ignition and at row 510, the driver may shift the vehicle 100 into gear. At row 512, the vehicle is not moving while at row 514, the vehicle is being driven. At row 516, the vehicle 100 may be placed in park through the gear shifter. At row 518, the ignition is shut off and at row 520, the driver may open their door. At row 522, the driver may close their door. After locking the vehicle 100, at row 524, each of the sections 102, 104, 106 and 108 may be scanned or monitored. This may provide a further guarantee that no other occupants are within the vehicle 100 including the front section 108.

Figure 6:
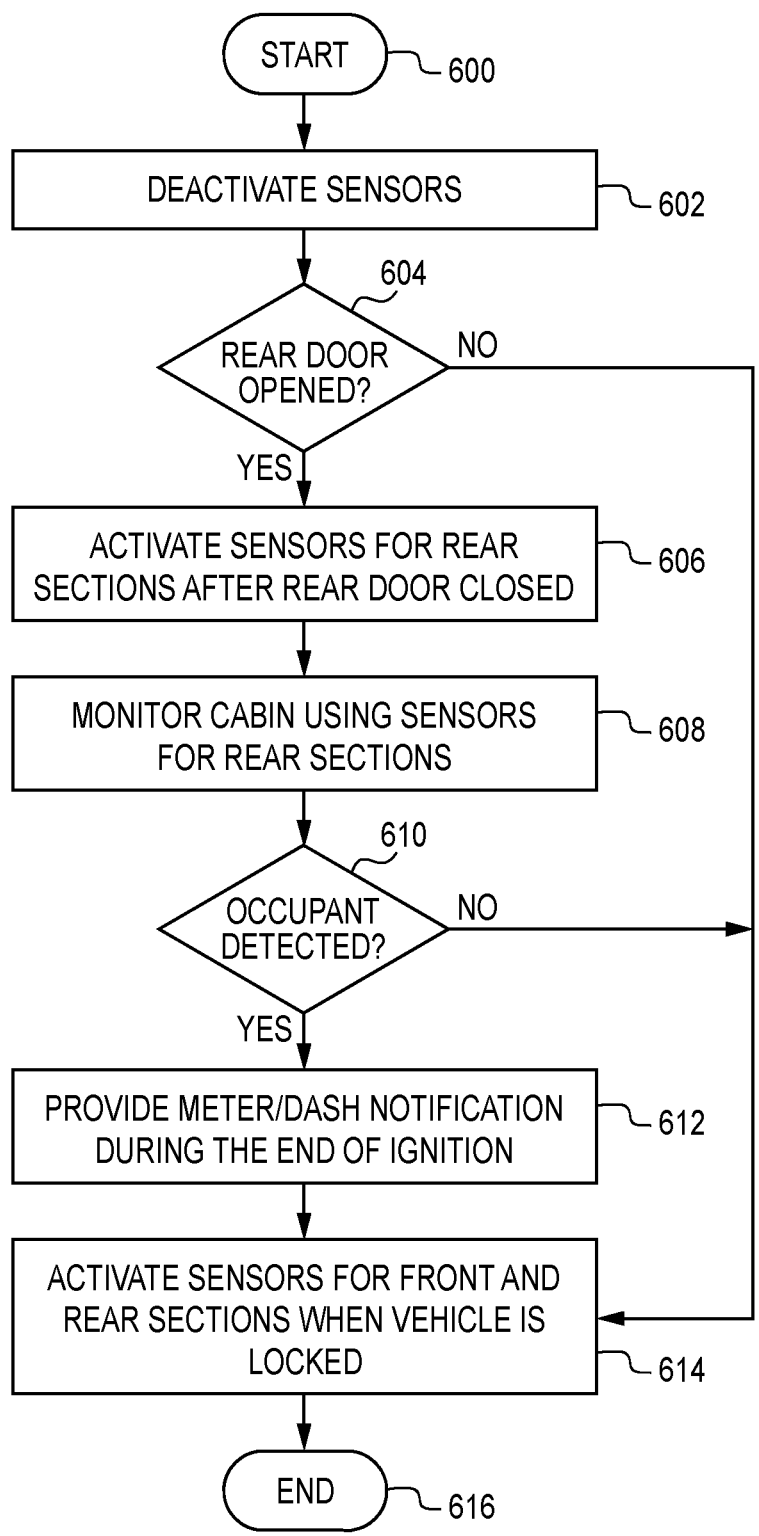
FIG. 6 is a schematic diagram of an illustrative flow chart showing processes for managing the different sensors in accordance with one aspect of the present disclosure.

With reference to FIG. 6, a schematic diagram of an illustrative flow chart showing processes for managing the different sensors 102, 104, 106 and 108 in accordance with one aspect of the present disclosure is provided. Fewer or more processes may be used and those shown are for purposes of illustration. The processes may begin at block 600. The vehicle control system 300 may handle these processes or operations, as described above.

At block 602, the sensors 102, 104, 106 and 108 may be set to inactive when the doors are unlocked. They may have been active as the doors 202 and 204 may have been locked. The vehicle occupant monitoring system may detect, at decision block 604, whether the rear door 204 has been opened. This is to determine whether the driver or passenger may be placing an occupant in the back or the occupant has entered the back of the vehicle 100. If the rear door 204 has not been opened, at block 614, each of the sensors 102, 104, 106 and 108 may be activated for each of the areas 110, 112, 114 and 116 when the vehicle 100 is locked. The processes may end at block 616.

When the rear door 204 has been opened, however, the vehicle occupant monitoring system may activate the rear sensors 104, 106 and 108 of the vehicle 100 at block 606. This may be performed by the fourth component 302D through the fourth ECU 304D. This may be detected when the rear door 204 is opened first and then the door is closed.

At block 608, the rear sensors 104, 106 and 108 may scan or monitor the second row area 112, third row area 114 and storage area 116. That is, the sensors 104, 106 and 108 may scan Sections 5 through 17, as described earlier. The monitoring and scanning may end after the vehicle 100 beings moving. This may remove false positives by the rear sensors 104, 106 and 108.

At decision block 610, a determination may be made whether an occupant was detected in the second row area 112, third row area 114 or storage area 116 between the time when the rear door 204 was closed and when the vehicle 100 began moving. When no occupant was detected during this period of time, then at block 614, each of the sensors 102, 104, 106 and 108 may be activated for each of the areas 110, 112, 114 and 116 when the vehicle 100 is locked. The processes may end at block 616.

However, and if there was an occupant detected, at block 612, the vehicle occupant monitoring system may provide a notification on the meter or dashboard. The notification may be displayed in other areas, as described above. The notification may be given during the end of ignition of the vehicle 100. Continuing, each of the sensors 102, 104, 106 and 108 may be activated when the vehicle 100 is locked at block 614. The processes may end at block 616.

The foregoing description is provided to enable any person skilled in the relevant art to practice the various embodiments described herein. Various modifications to these embodiments will be readily apparent to those skilled in the relevant art and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A vehicle occupant monitoring system within a vehicle, comprising:
    at least one rear sensor;
    at least one processor; and
    a memory operatively coupled to the at least one processor, the memory is configured to store program instructions that when executed by the at least one processor, causes the at least one processor to:
      determine whether a rear door has been closed;
      activate the at least one rear sensor to detect an occupant in rear seats of the vehicle when the rear door has been closed;
      deactivate the at least one rear sensor when the vehicle moves to remove false positives created by shadows or other background environmental features and save power; and
      provide a notification if an occupant was detected by the at least one rear sensor while the at least one rear sensor was activated after the vehicle is turned off.

2. The vehicle occupant monitoring system of claim 1, wherein the at least one rear sensor comprises a second row sensor, a third row sensor and a storage sensor.

3. The vehicle occupant monitoring system of claim 2, wherein the at least one processor is configured to monitor a second row area with the second row sensor, a third row area with the third row sensor and a storage area with the storage sensor when activated.

4. The vehicle occupant monitoring system of claim 1, wherein the at least one processor is configured to keep the at least one rear sensor idle when the rear door has not been closed.

5. The vehicle occupant monitoring system of claim 1, wherein the at least one processor is further configured to control display of the notification based on the detected occupant and when a gear shifter is placed in park.

6. The vehicle occupant monitoring system of claim 5, wherein the at least one processor is further configured to control display of the notification on a dashboard or on a head unit of the vehicle.

7. The vehicle occupant monitoring system of claim 1, further comprising at least one front sensor, wherein the at least one processor is configured to activate the at least one front sensor and the at least one rear sensor when the vehicle is locked.

8. The vehicle occupant monitoring system of claim 1, wherein the vehicle is turned off by setting an ignition to off.

9. The vehicle occupant monitoring system of claim 1, wherein the at least one processor is configured to deactivate the at least one rear sensor when the vehicle moves at a predefined speed.

10. The vehicle occupant monitoring system of claim 1, wherein the at least one processor is configured to restrict locking of the vehicle based on the detected occupant.

11. A method of detecting an occupant within a vehicle, comprising:
    deactivating a front sensor and a rear sensor within the vehicle;
    determining whether a rear door has been closed;
    activating the rear sensor when the rear door has been closed to detect an occupant in rear seats of the vehicle;
    deactivating the rear sensor when the vehicle moves to remove false positives created by shadows or other background environmental features and save power; and
    providing a notification if an occupant was detected by the rear sensor while the rear sensor was activated after the vehicle is placed in park.

12. The method of detecting the occupant within the vehicle of claim 11, further comprising keeping the rear sensor inactivated when the rear door has not been closed.

13. The method of detecting the occupant within the vehicle of claim 11, wherein providing the notification comprises presenting the notification on a dashboard or on a head unit of the vehicle.

14. The method of detecting the occupant within the vehicle of claim 11, further comprising activating the front sensor and the rear sensor within the vehicle after the vehicle is locked.

15. The method of detecting the occupant within the vehicle of claim 11, wherein activating the rear sensor comprises initiating a second row sensor, a third row sensor and a storage sensor of the vehicle.

16. The method of detecting the occupant within the vehicle of claim 15, wherein the second row sensor is configured to monitor a second row area, the third row sensor is configured to monitor a third row area, and the storage sensor is configured to monitor a storage area when activated.

17. A vehicle, comprising:
    at least one front sensor;
    at least one rear sensor; and
    a control system configured to:
      determine whether a rear door has been closed;
      activate the at least one rear sensor to detect whether an occupant is in a rear seat of the vehicle when the rear door has been closed,
      deactivate the at least one rear sensor when the vehicle moves to remove false positives created by shadows or other background environmental features and save power; and provide a notification if an occupant was detected by the at least one rear sensor while the at least one rear sensor was activated after the vehicle is placed in park.

18. The vehicle of claim 17, wherein the at least one front sensor is configured to monitor a different area within the vehicle from the at least one rear sensor.

19. The vehicle of claim 17, wherein the at least one rear sensor comprises a second row sensor, a third row sensor and a storage sensor.

20. The vehicle of claim 17, wherein the control system is further configured to keep the at least one rear sensor idle when the rear door has not been closed.

21. The vehicle of claim 17, wherein the control system is further configured to activate the at least one front sensor and the at least one rear sensor after the vehicle is locked.

* * * * *